(12) United States Patent
Lee et al.

(10) Patent No.: US 6,751,207 B1
(45) Date of Patent: Jun. 15, 2004

(54) TUNNELLING VOICE OVER THE INTERNET PROTOCOL IN A CELLULAR NETWORK

(75) Inventors: Jau Young Lee, Pleasanton, CA (US); William C. Y. Lee, Danville, CA (US)

(73) Assignee: Cellco Partnership, Bedminster, NJ (US)

( * ) Notice: Subject to any disclaimer, the term of this patent is extended or adjusted under 35 U.S.C. 154(b) by 761 days.

(21) Appl. No.: 09/620,639

(22) Filed: Jul. 21, 2000

Related U.S. Application Data

(60) Provisional application No. 60/145,870, filed on Jul. 27, 1999.

(51) Int. Cl.[7] .................................................. H04Q 7/24
(52) U.S. Cl. ........................ 370/338; 370/401; 370/402
(58) Field of Search ................................ 370/338, 351, 370/352, 353, 356, 395.52, 400, 401, 403, 389, 392, 341, 349, 329, 354, 402; 455/432, 433, 455, 555, 556

(56) References Cited

U.S. PATENT DOCUMENTS

| | | | | |
|---|---|---|---|---|
| 5,842,224 A | * | 11/1998 | Fenner | 370/392 |
| 6,161,008 A | * | 12/2000 | Lee et al. | 370/352 |
| 6,539,237 B1 | * | 3/2003 | Sayers et al. | 455/555 |
| 6,611,516 B1 | * | 8/2003 | Pirkola et al. | 370/352 |

* cited by examiner

Primary Examiner—Phirin Sam
(74) Attorney, Agent, or Firm—Gates & Cooper LLP

(57) ABSTRACT

A method for tunneling voice over the Internet Protocol (IP) in a cellular network. A Mobile Identification Number (MIN) of a non-IP-enabled handset is mapped to the IP address of a component of a cellular network in communication with that handset. A sub-index is assigned to the handset by the component, wherein the sub-index acts as an extension to the IP Address of the component, so that a non-IP-enabled handset can be correctly identified within the cellular network.

20 Claims, 4 Drawing Sheets

TUNNELLING VOICE OVER THE INTERNET PROTOCOL IN A CELLULAR NETWORK

CROSS REFERENCE TO RELATED APPLICATIONS

This application claims priority under 35 U.S.C. §119(e) to U.S. Provisional Patent Application No. 60/145,870, filed Jul. 27, 1999, entitled "TUNNELLING VOIP THROUGH IP BTS" by David J. Y. Lee and William C. Y. Lee, which application is incorporated by reference herein.

This application is related to the following co-pending and commonly-assigned U.S. Patent Applications:

Ser. No. 09/590,346, filed Jun. 8, 2000, by David J. Y. Lee, Ce Xu, and William C. Y. Lee, entitled "MOBILE INTERNET PROTOCOL SQUARE"; and Ser. No. 09/589,974, filed Jun. 8, 2000, by David J. Y. Lee, Ce Xu, and William C. Y. Lee, entitled "ARCHITECTURE OF INTERNET PROTOCOL-BASED CELLULAR NETWORKS";

both of which applications are incorporated by reference herein.

BACKGROUND OF THE INVENTION

1. Field of the Invention

The present invention relates to cellular telephone systems, and, in particular, to tunneling voice over the Internet Protocol in a cellular telephone system.

2. Description of the Related Art

With the Internet and the associated Internet Protocol (IP) gaining popularity with customers, it is now possible to use IP via the Internet (or an intranet) to deliver wireless voice services. However, four issues remain to be resolved.

The first issue is the choice of a fixed IP address scheme or a dynamic IP address scheme for IP-enabled handsets. The second issue is how to support non-IP-enabled handsets in Voice over IP (VoIP) applications. The third issue is how to effectively manage and route IP packets. The fourth issue is how to communicate with other IP or non-IP networks effectively.

The present invention focuses on the second issue and provides an effective solution for supporting non-IP-enabled handsets in tunneling VoIP through a cellular network. This solution efficiently manages, arranges and controls IP resources, thereby improving system performance.

SUMMARY OF THE INVENTION

To overcome the limitations in the prior art described above, and to overcome other limitations that will become apparent upon reading and understanding the present specification, the present invention discloses a method for tunneling voice over the Internet Protocol (IP) in a cellular network. A Mobile Identification Number (MIN) of a non-IP-enabled handset is mapped to the IP address of a component of a cellular network in communication with that handset. A sub-index is assigned to the handset by the component, wherein the sub-index acts as an extension to the IP Address of the component, so that a non-IP-enabled handset can be correctly identified within the cellular network.

BRIEF DESCRIPTION OF THE DRAWINGS

Referring now to the drawing in which like reference numbers represent corresponding parts throughout.

DETAILED DESCRIPTION OF THE PREFERRED EMBODIMENT

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Operating Environment

Figure 1:
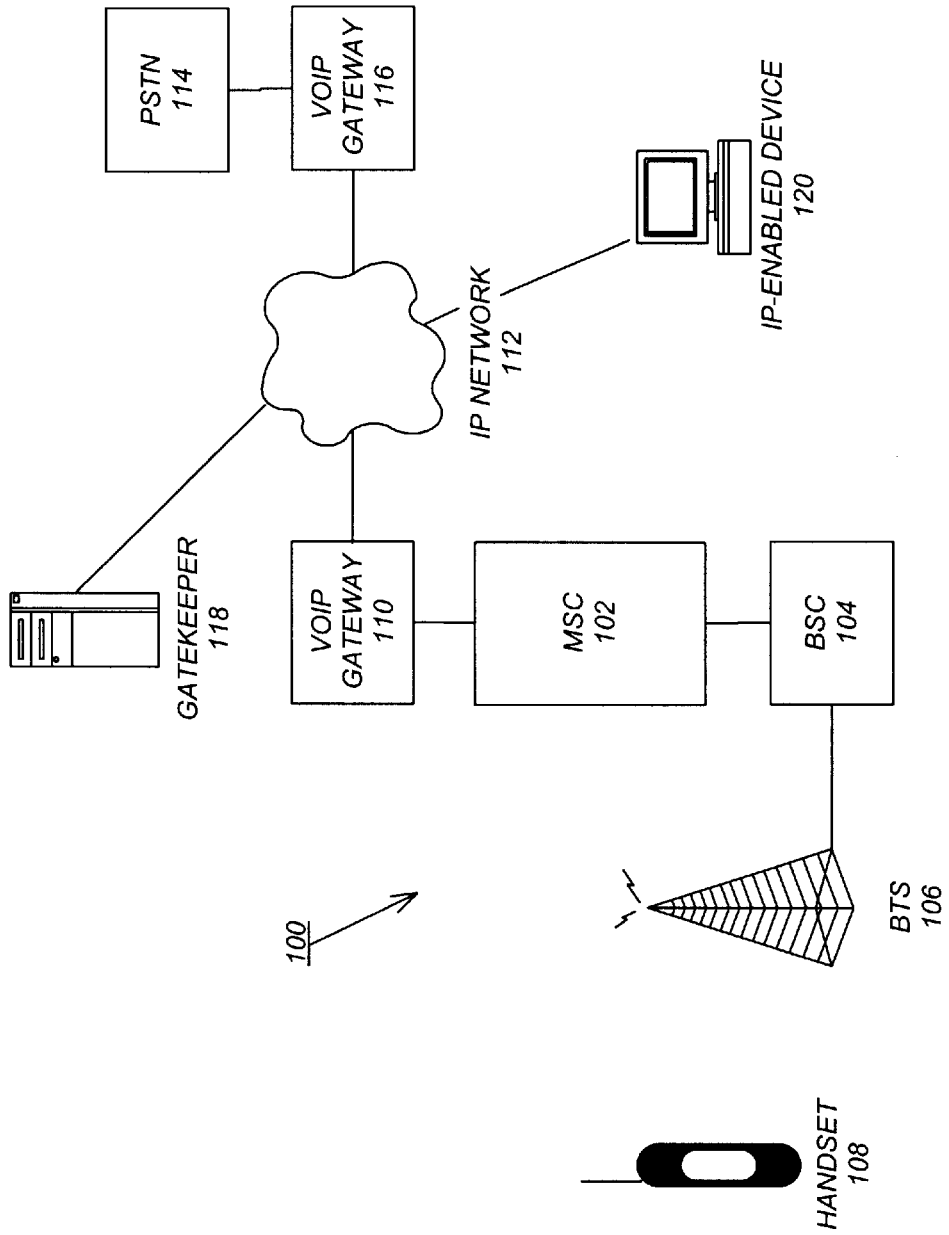
FIG. 1 illustrates a cellular network used for voice over Internet Protocol (VoIP) applications according to the preferred embodiment of the present invention.

FIG. 1 illustrates a cellular network 100 used for VoIP applications according to the preferred embodiment of the present invention. The network 100 includes at least one MSC (Mobile Switching Center) 102, at least one BSC (Base Station Controller) 104, and at least one BTS (Base Transceiver Station) 106 for communicating with one or more handsets 108 or other transceiver. The MSC 102 includes a VoIP Gateway 110 into an IP network 112 for use by the handsets 108. Similarly, a PSTN (Public Switched Telephone Network) 114 includes a VoIP Gateway 116 into an IP network 112 for use by landline phones (not shown). The VoIP Gateway 112 allows the handsets 108 to connect to any IP-enabled device 120 that itself is connected to the IP network 112. Likewise, the VoIP Gateway 116 allows the landline phones to connect to any IP-enabled device 120 that itself is connected to the IP network 112.

Problems exists in routing VoIP to/from handsets 108 that are not IP-enabled (i.e., that do not recognize IP addresses). In order to utilize the IP network 112, each handset 108 needs to have an IP address. Moreover, each IP address needs to be understood by each and every adjacent node in the IP network 112. Moreover, there is the potential need for thousands of IP addresses in a cellular network 100, which could flood IP routing tables, since each router (e.g., MSC, BSC, BTS, VoIP Gateway) needs to know all of its surrounding IP addresses.

The present invention solves this problem by mapping a Mobile Identification Number (MIN) of a handset 108 to the IP address of a BTS 106 in communication with that handset 108. Moreover, a "sub-index" is assigned to the handset 108 by the BTS 106, wherein the sub-index acts as an extension to the IP Address of the BTS 106, so that a non-IP-enabled handset 108 can be correctly identified within the cellular network 100. A Gatekeeper 118 stores these mappings in a table, along with the mappings from the handset 108 to a device in communication therewith.

IP Header

Figure 2:
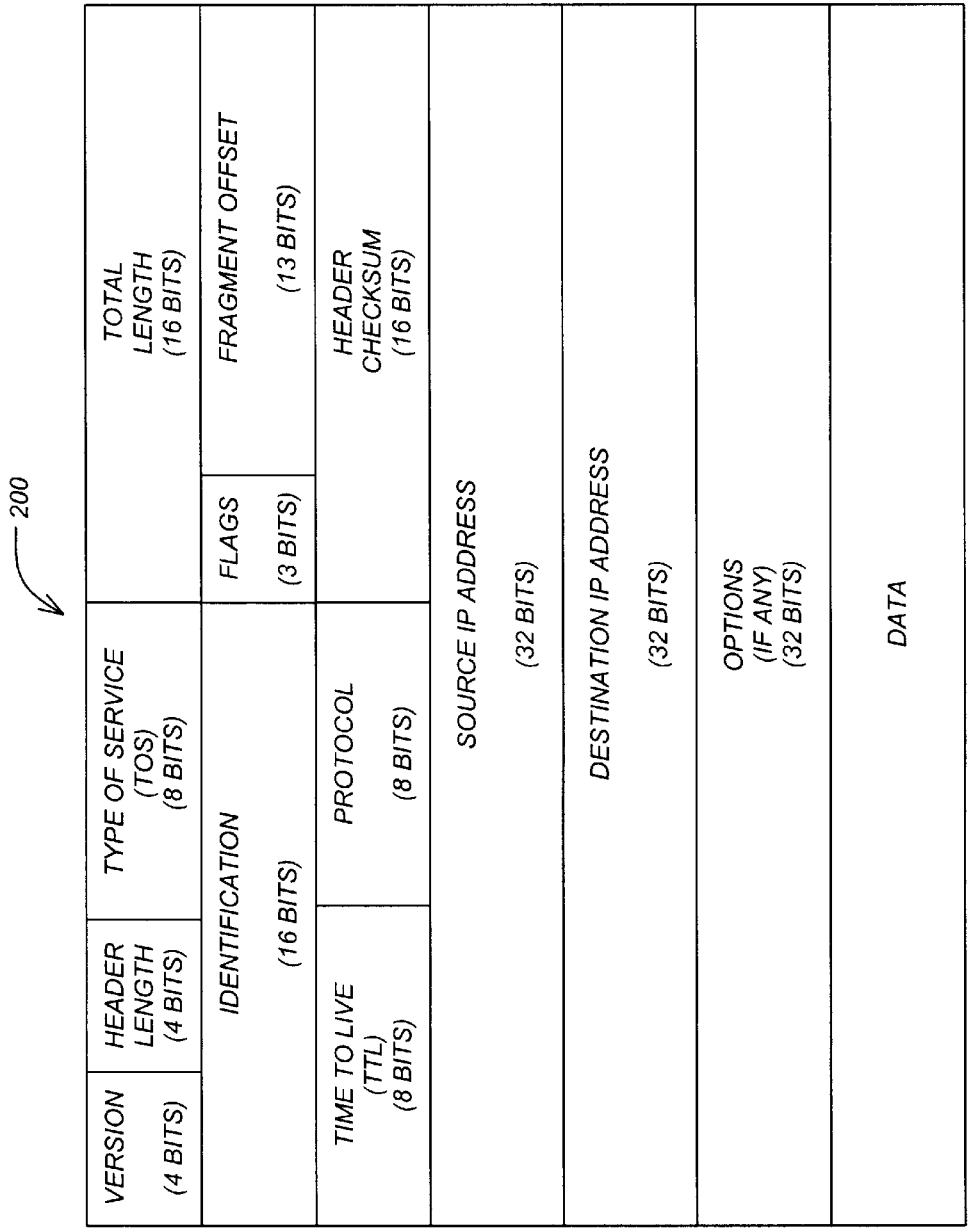
FIG. 2 illustrates the structure of an IP header from the IPv4 standard.

FIG. 2 illustrates the structure of an IP header 200 (from the IPv4 standard), which includes the following fields: Version (4 bits), Header Length (4 bits), Type of Service (TOS) (8 bits), Total Length (16 bits), Identification (16 bits), Flags (3 bits), Fragment Offset (13 bits), Time To Live (TTL) (8 bits), Protocol (8 bits), Header Checksum (16 bits), Source IP Address (32 bits), Destination IP Address (32 bits), Options (if any) (32 bits), and Data.

The Source IP Address and Destination IP Address are each somewhat of a hybrid, since they can be thought of as either logical or physical addresses. An IP Address is a unique number assigned to a node on the IP network 112, which manes it seem physical. However, an IP address can be dynamically assigned, for example, by an Internet Service Provider (ISP) handling dialup clients, which makes the IP address seem more like a logical address.

The Source IP Address and Destination IP Address are each 32 bits in length, and comprise a network address and host address (NetID and HostID). Typically, the Source IP Address and Destination IP Address are written as four sets of numbers separated by periods; for example, 204.171.64.2.

In an IP Address, the more bits used for the network address, the fewer remain for the host address. Moreover, the value of the eight high-order bits identify the classes described below:

| Class | Class Number | Maximum Networks | Maximum Hosts | Bits in NetID/HostID |
|---|---|---|---|---|
| A | 1–127 | 127 | 16,777,214 | 7/24 |
| B | 129–191 | 16,383 | 65,534 | 14/16 |
| C | 192–223 | 2,097,151 | 254 | 21/8 |

Class C addresses can be expanded using the CIDR (Classless Inter-Domain Routing) addressing scheme. CIDR is a method for creating additional addresses on the IP network 112, which are given, for example, to ISPs that, in turn, delegate them to their customers. In this sense, the cellular network 100 comprises an ISP in that the additional IP addresses are delegated to the handsets 108. CIDR reduces the burden of IP routing by aggregating routes, so that one IP address represents multiple handsets 108 that are serviced by the cellular network 100.

CIDR uses a variable network ID instead of the fixed numbers shown in the table above. Instead of the fixed 7, 14 and 21 bits used in the Class A-B-C network IDs, CIDR uses a variable network ID from 13 to 27 bits. Specifically, the preferred embodiment invention uses an 8-bit Class C address scheme that provides 128 options for network IDs, e.g., 128.255 IDs for the MSCs 102, 255.255 IDs for the BSCs 104, and 255.255.255 IDs for BTS's 106.

Figure 3:
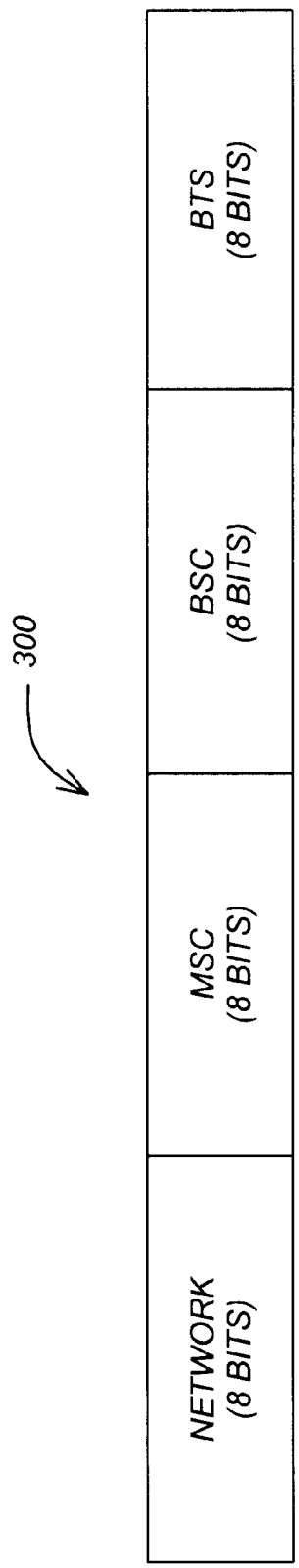
FIG. 3 illustrates the structure of the network ID assignments according to the preferred embodiment of the present invention.

FIG. 3 illustrates the structure 300 of the assignment of network IDs according to the preferred embodiment of the present invention, which includes the following fields: Network (8 bits) that comprises specific network 100 or region identifiers, MSC (8 bits) that comprises MSC 102 identifiers for MSCs 102 within the specific network 100 or region, BSC (8 bits) that comprises BSC 104 identifiers for BSCs 104 connected to the MsCs 102, and BTS (8 bits) comprises BTS 106 identifiers for BTS's 106 connected to the BSCs 104.

In the preferred embodiment, the BTS 106 assigns dynamic pseudo-IP addresses to non-IP-enabled handsets 108, wherein these dynamic pseudo-IP addresses comprise the IP Address of the BTS 106 currently in communication with the handset 108 and an assigned sub-index. The mapping of the MIN of the handset 108 to the dynamic pseudo-IP address is then maintained by the Gatekeeper 118, working in conjunction with the MSC 102, BSC 104, BTS 106, and VoIP Gateway 110. Specifically, the MIN may be re-mapped to another dynamic pseudo-IP address as it moves from BTS 106 to BTS 106 in the cellular network 100.

The following table is an example of a mapping table maintained by the Gatekeeper 118, wherein the table maps MINs to dynamic pseudo-IP addresses, and maps dynamic pseudo-IP addresses to Destination IP addresses for when the handset 108 is communicating with another device:

| MIN | Dynamic Pseudo-IP Address | Destination IP Address |
|---|---|---|
| 925 810 3990 | 151.144.99.88 sub index 1 | 123.4.5.255 |
| 710 285 2334 | 151.144.99.88 sub index 2 | — |
| 212 459 0789 | 151.144.99.88 sub index 3 | — |
| 210 458 3423 | 151.144.99.88 sub index 4 | 165.21.132.141 |
| *** | *** | *** |
| 211 567 8390 | 151.144.99.88 sub index n | 255.128.64.32 |

Using the present invention, the pseudo-IP addresses are "tunneled" through the BTS 106 into a standard IP header for communication with the IP-enabled devices 120 on the IP network 112. Moreover, the mapping table is updated as required, e.g., the dynamic pseudo-IP addresses are updated as the handset 108 is handed off from one BTS 108 to another BTS 108, and the BSCs 104, MSCs 102, VoIP Gateways 110, and Gatekeeper 118 are notified as such updates occur.

Consider the following example. When a handset 108 registers with the cellular network 100, a BTS 106 maps the MIN of the handset 108 to its IP Address and assigns an available sub-index. This information is relayed to the BSC 104, the MSC 102, and the VoIP Gateway 110, as well as the Gatekeeper 118.

If the IP-enabled device 120 initiates a VoIP call setup to the handset 108 using the MIN of the handset 108, a call setup request including the MIN is routed to the cellular network 110. The MSC 102 receives the call setup request and communicates with the Gatekeeper 118 to obtain the dynamic pseudo-IP address associated with the MIN of the handset 108.

The call setup is then routed to the appropriate BTS 106, wherein communication between the MSC 102 receiving the call setup and the MSC 102 in control of the handset 108 is resolved by the first two fields of the dynamic pseudo-IP address, the BSC 104 is uniquely identified by the first three fields of the dynamic pseudo-IP address, and the BTS 106 is resolved by all fields of the dynamic pseudo-IP address. Of course, if the handset 108 moves, and handoffs occur within the cellular network 100, another BTS 106 could take over the communication functions.

Thereafter, the BTS 106 effects communication between the non-IP-enabled handset 108 and the IP-enabled device 120 using the dynamic pseudo-IP address of the handset 108 and the IP address of the IP-enabled device 120. Although the BTS 106 receives only its own IP address as an identifier from the IP-enabled device 120, and not the sub-index associated with the desired handset 108, it can identify the desired handset 108 from the mapping table maintained by the Gatekeeper 118 by identifying the IP-enabled device 120 that sent the data.

Efficient Packetizing of VoIP Data

The preferred embodiment also modifies the fields in the IP header to support higher QoS (Quality of Service) for VoIP applications in the cellular network 100. Specifically, the 48 bits represented by the Total Length, Identification, Flags, and Fragment Offset fields are used to store sub-indexes that identify packets stored in the Data field following the IP header, so that data associated with multiple handsets 108 can be transferred by means of one IP header.

In the preferred embodiment, each BTS 106 can support up to 16 handsets 108 using 4-bit sub-indexes. The 48 bits of the IP header normally represented by the Total Length, Identification, Flags, and Fragment Offset fields can thus store 12 of the 4-bit sub-indexes, each of which indicates that an associated packet of data is stored in the Data field following the IP header.

Figure 4:
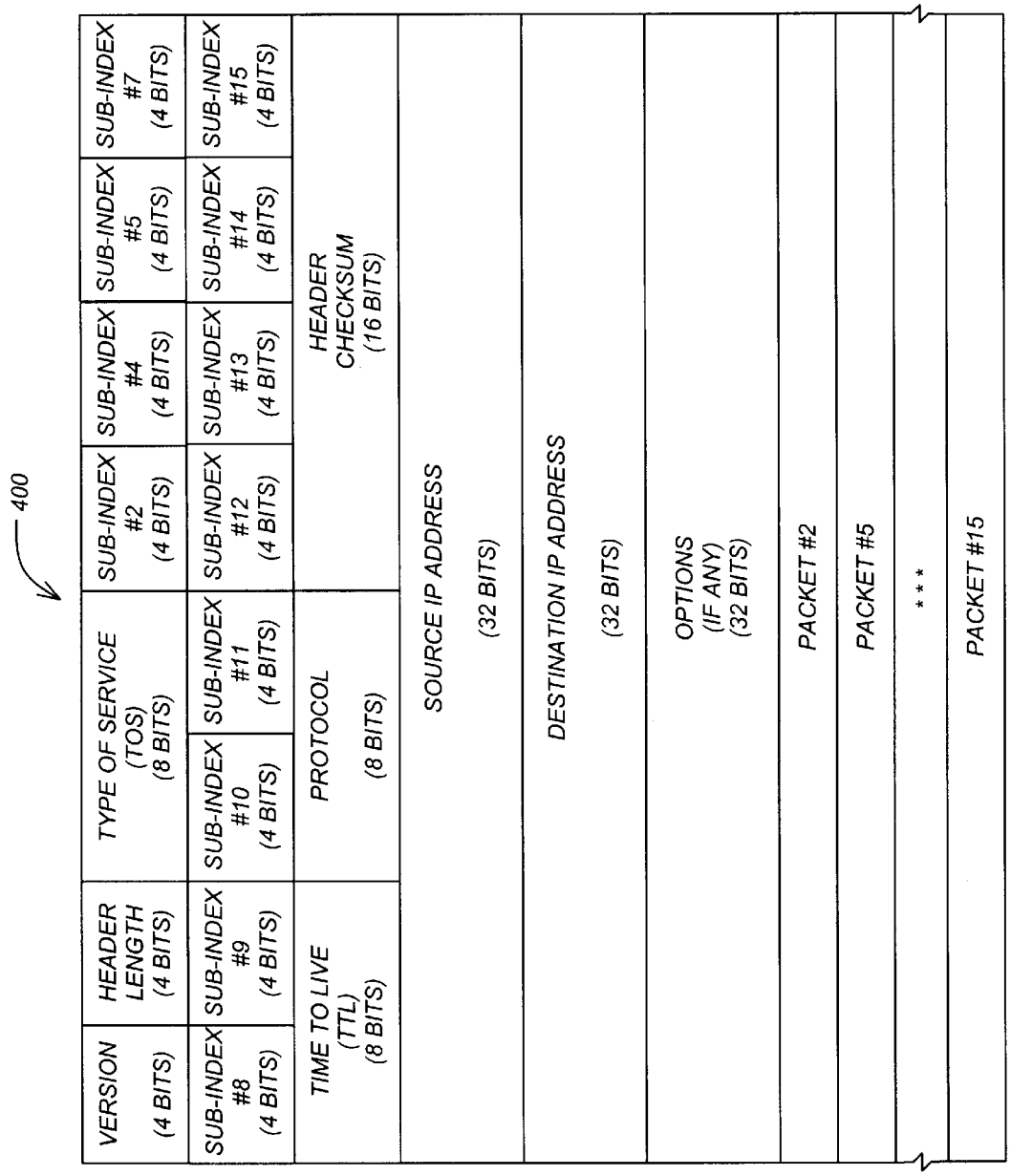
FIG. 4 illustrates the modified structure of the IP header according to the preferred embodiment of the present invention.

FIG. 4 illustrates the modified structure 400 of the IP header according to the preferred embodiment of the present invention. In this modified structure 400, 14 sub-indexes indexes, each comprising 4 bits, are stored in the 48 bits that normally represent the Total Length, Identification, Flags, and Fragment Offset fields of the IP header. Specifically, in the example of FIG. 4, sub-indexes #2, #4, #5, #7, #8, #9, #10, #11, #12, #13, #14, and #15 are stored in these 48 bits.

The position of these 14 sub-indexes indicate the position of packets of data associated with each handset 108 and stored in the Data field following the IP header. Specifically, in the example of FIG. 4, Packets #2, #4, #5, #7, #8, #9, #10, #11, #13, #14, and #15 are stored in the Data field (only Packets #2, #4 and #15 are shown in FIG. 4, while Packets #5, #7, #8, #9, #10, #11, #12, #13, and are inferred from the ellipse). Note that these packets may be any specified size and any specified structure.

Packets for different handsets 108 travelling from/to the same/different BTS's 106 can be combined/distributed at the BSC 104. Similarly, the packets travelling from/to different BSCs 104 can be combined/distributed at the MSC 102. The MSC 102 needs to control the functionality of the VoIP Gateway 110 to packet voice data into the proposed sub-index format.

Conclusion

This concludes the description of the preferred embodiment of the invention. The following describes some alternative embodiments for accomplishing the present invention.

Although the Gatekeeper 118 is shown in FIG. 1 as being directly coupled to the IP network 112, note that it could be coupled to the cellular network 100 in alternative embodiments. In addition, the Gatekeeper 118 could be performed by a component of the cellular network 100. For example, the functions of the Gatekeeper 118 could be performed by a Home Location Register/Visitor Location Register (HLR/VLR) within the cellular network 100.

Different addressing schemes than those described herein could be used. For example, the number of bits of the IP addresses used to identify the network 100, MSC 102, BSC 104, or BTS 106 could be different. Moreover, the sub-index could be of any desired size.

Other fields of the IP header could be used to store the sub-indexes. Alternatively, the sub-indexes could be stored in the Data field following the IP header. Another embodiment might have fixed portions of the Data field associated with specific sub-indexes, eliminating the need to transmit the sub-indexes in the IP header.

Components other than BTS's 106 could be used to assign dynamic pseudo-IP addresses to handsets. In an alternative embodiment, this function could be performed by the BSCs 104, MSCs 102, VoIP Gateway 110, or the Gatekeeper 118 itself.

In summary, the present invention discloses a method for tunneling voice over the Internet Protocol (IP) in a cellular network. A Mobile Identification Number (MIN) of a non-IP-enabled handset is mapped to the IP address of a component of a cellular network in communication with that handset. A sub-index is assigned to the handset by the component, wherein the sub-index acts as an extension to the IP Address of the component, so that a non-IP-enabled handset can be correctly identified within the cellular network The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for tunneling data over an Internet Protocol (IP) network, comprising:
    (a) mapping a mobile identification number of a cellular transceiver in a cellular network to a dynamic pseudo-IP address, wherein the dynamic pseudo-IP address comprises an IP address of a component of the celluar network in communication with the cellular transceiver and a sub-index assigned to the cellular transceiver by the component, and the sub-index acts as an extension to the IP Address of the component, so that the cellular transceiver can be identified within the cellular network; and
    (b) facilitating communication between the cellular transceiver in the cellular network and another device on the IP network by tunneling the dynamic pseudo-IP address of the cellular transceiver to an IP address for the device.

2. The method of claim 1, wherein the cellular transceiver is not IP-enabled.

3. The method of claim 1, further comprising re-mapping the mobile identification number of the cellular transceiver to another dynamic pseudo-IP address when the cellular transceiver is communicating with another component of the cellular network, wherein the dynamic pseudo-IP address comprises an IP address of the other component of the cellular network in communication with the cellular transceiver and a sub-index assigned to the cellular transceiver by the other component, and the sub-index acts as an extension to the IP Address of the other component, so that the cellular transceiver can be identified within the cellular network.

4. The method of claim 1, wherein the mapped mobile identification number of the cellular transceiver is stored in a table maintained by a gatekeeper.

5. The method of claim 4, wherein the gatekeeper stores the IP address for the device in the table with the mapped mobile identification number of the cellular transceiver.

6. The method of claim 5, further comprising updating the table as required.

7. The method of claim 1, wherein the communication is effected by using an IP header, and the method further comprises storing the sub-index in the IP header.

8. The method of claim 7, wherein multiple sub-indexes are stored in the IP header, so that data associated with multiple cellular transceivers can be transferred using one IP header.

9. The method of claim 8, wherein each of the sub-indexes stored in the IP header identify a corresponding data packet associated with the IP header.

10. A system for tunneling data over an Internet Protocol (IP) network, comprising:
    (a) means for mapping a mobile identification number of a cellular transceiver in a cellular network to a dynamic pseudo-IP address, wherein the dynamic pseudo-IP address comprises an IP address of a component of the cellular network in communication with the cellular transceiver and a sub-index assigned to the cellular transceiver by the component, and the sub-index acts as an extension to the IP Address of the component, so that the cellular transceiver can be identified within the cellular network; and (b) means for facilitating communication between the cellular transceiver in the cellular network and another device on the IP network by tunneling the dynamic pseudo-IP address of the cellular transceiver to an IP address for the device.

11. The system of claim 10, wherein the cellular transceiver is not IP-enabled.

12. The system of claim 10, further comprising means for re-mapping the mobile identification number of the cellular transceiver to another dynamic pseudo-IP address when the cellular transceiver is communication with another component of the cellular network, wherein the dynamic pseudo-IP address comprises an IP address of the other component of the cellular network in communication with the cellular tansceiver and a sub-index assigned to the cellular transceiver by the other component, and the sub-index acts as an extension to the IP Address of the other component, so that the cellular transceiver can be identified within the cellular network.

13. The system of claim 10, wherein the mapped mobile identification number of the cellular transceiver is stored in a table maintained by a gatekeeper.

14. The system of claim 13, wherein the gatekeeper stores the IP address for the device in the table with the mapped mobile identification number of the cellular transceiver.

15. The system of claim 14, further comprising means for updating the table as required.

16. The system of clam 10, wherein the communication is effected by using an IP header, and the method further comprises storing the sub-index in the IP header.

17. The system of claim 16, wherein multiple sub-indexes are stored in the IP header, so that data associated with multiple cellular transceivers can be transferred using one IP header.

18. The system of claim 17, wherein each of the sub-indexes stored in the IP header identify a corresponding data packer associated with the IP header.

19. A system for communicating between cellular phones and Internet Protocol (IP) enabled devices, comprising:

a cellular communications system coupled to an Internet Protocol (IP) network, wherein the cellular communications system transmits and receives communications to and from cellular transceivers, and the IP network transmits and receives communications to and from IP-enabled devices; and a gatekeeper device, in communication with the cellular communications system, for facilitating communications between the cellular transceivers and the IP-enabled devices, wherein the gatekeeper device maps a mobile identification number (MIN) of the cellular transceiver to a dynamic pseudo-IP address, the dynamic pseudo-IP address comprises an IP address of a component of the cellular communications system in communication with the cellular transceiver and a sub-index assigned to the cellular transceiver by the component, and the sub-index acts as an extension to the IP Address of the component, so that the cellular transceiver can be identified within the cellular communication system and communicate with the IP-enabled device in the IP network.

20. The system of claim 19, wherein the gatekeeper device re-maps the MIN of the cellular transceiver to another dynamic pseudo-IP address when the cellular transceiver is communicating with another component of the cellular communication systems, wherein the dynamic pseudo-IP address comprises an IP address of the other component of the cellular communications system in communication with the cellular transceiver and a sub-index assigned to the cellular transceiver by the other component, and the sub-index acts as an extension to the IP Address of the other component, so that the cellular transceiver can be identified within the cellular communication system and communicate with the IP-enabled device in the IP network.

* * * * *

UNITED STATES PATENT AND TRADEMARK OFFICE
CERTIFICATE OF CORRECTION

PATENT NO.     : 6,751,207 B1
DATED          : June 15, 2004
INVENTOR(S)    : Jau Young Lee et al.

It is certified that error appears in the above-identified patent and that said Letters Patent is hereby corrected as shown below:

Column 7,
Line 13, "communication" should read -- communicating --.
Line 30, "clam" should read -- claim --.
Line 39, "packer" should read -- packet --.

Signed and Sealed this

Twenty-eighth Day of September, 2004

JON W. DUDAS
*Director of the United States Patent and Trademark Office*